United States Patent [19]

Matsuoka et al.

[11] 4,275,903
[45] Jun. 30, 1981

[54] PASSIVE SEAT BELT ARRANGEMENT WITH WHEELED BELT CARRIER

[75] Inventors: Hideoki Matsuoka, Yokohama; Yoshinobu Kondo, Kosai, both of Japan

[73] Assignees: Nissan Motor Company, Limited, Yokohama; Fuji Kiko Company, Limited, Tokyo, both of Japan

[21] Appl. No.: 56,600

[22] Filed: Jul. 11, 1979

[30] Foreign Application Priority Data

Jul. 19, 1978 [JP] Japan .................................. 53-88017

[51] Int. Cl.³ ............................................. B60R 21/10
[52] U.S. Cl. ................................... 280/803; 297/469
[58] Field of Search ..................... 280/804, 803, 802; 297/469; 16/93 D, 93 R, 95 D, 95 R, 96; 104/93, 94, 244.1

[56] References Cited

U.S. PATENT DOCUMENTS

| | | | |
|---|---|---|---|
| 2,858,144 | 10/1958 | Oppenheim | 280/804 |
| 3,879,799 | 4/1975 | Williams | 104/94 |
| 3,950,952 | 4/1976 | Krings | 104/244.1 X |

FOREIGN PATENT DOCUMENTS 2445688  4/1976  Fed. Rep. of Germany ........... 280/804

*Primary Examiner*—John A. Pekar

[57] ABSTRACT

A passive seat belt arrangement has an improved belt carrying mechanism which comprises a track member diagonally mounted on a vehicular hinged door, and a wheeled belt carrying device which runs in the track member to carry an intermediate portion of the seat belt for preparing easy-enter and occupant restraining positions of the belt in response to opening and closing movements of the door.

4 Claims, 5 Drawing Figures

PASSIVE SEAT BELT ARRANGEMENT WITH WHEELED BELT CARRIER

FIELD OF THE INVENTION

The present invention relates in general to a passive seat belt arrangement for a motor vehicle, and more particularly to a belt carrying mechanism by which a portion of the belt is carried forward causing the belt to take an easy-enter position during door opening movement and rearward causing the belt to take an occupant restraining position during door closing movement.

BACKGROUND OF THE INVENTION

Some of known passive seat belt arrangements are so constructed that a portion of the seat belt is held by a belt carrying member that is slidably received in a diagonally oriented door-mounted track member for movement between forward and rearward positions in response to door opening and closing movements to move the belt between easy-enter and occupant restraining positions. As will become clear as the description proceeds, however, the belt carrying mechanisms of such type seat belt arrangements are inadequate to smoothly and positively carry the belt because of the generation of excessive sliding friction between the belt carrying member and the track member. This sometimes induces insufficient operation of the passive seat belt arrangement in providing the belt with the easy-enter and occupant restraining positions.

OBJECTS OF THE INVENTION

It is therefore an object of the present invention to provide a passive seat belt arrangement having an improved belt carrying mechanism by which a portion of the seat belt is smoothly and positively carried in forward and rearward directions.

According to the present invention, there is provided a passive seat belt arrangement in a motor vehicle having a door, comprising a seat belt, a track member mounted on an interior part of the vehicle and having a generally C-shaped cross section with a longitudinally extending slot thereof facing inboard of the vehicle, and a belt carrying device longitudinally movably received in the track member for carrying a portion of the seat belt so that movements of the belt carrying device in the track member in one and the other directions cause the seat belt to take easy-enter and occupant restraining positions, respectively, wherein the belt carrying device is provided with at least one cylindrical roller which runs in the track member by contacting only the peripheries of circular both ends thereof with the inside surface of track member in a point contact manner upon the longitudinal movement of the carrying member in and along the track member.

BRIEF DESCRIPTION OF THE DRAWINGS

Other objects and advantages of the present invention will become clear from the following description when taken in conjunction with the accompanying drawings, in which.

DESCRIPTION OF CONVENTIONAL SEAT BELT ARRANGEMENTS

Prior to describing in detail the construction of the passive seat belt arrangement of the invention, an outlined explanation of a conventional arrangement will be made with reference to FIGS. 1 to 3 in order to clarify the invention.

Figure 1:
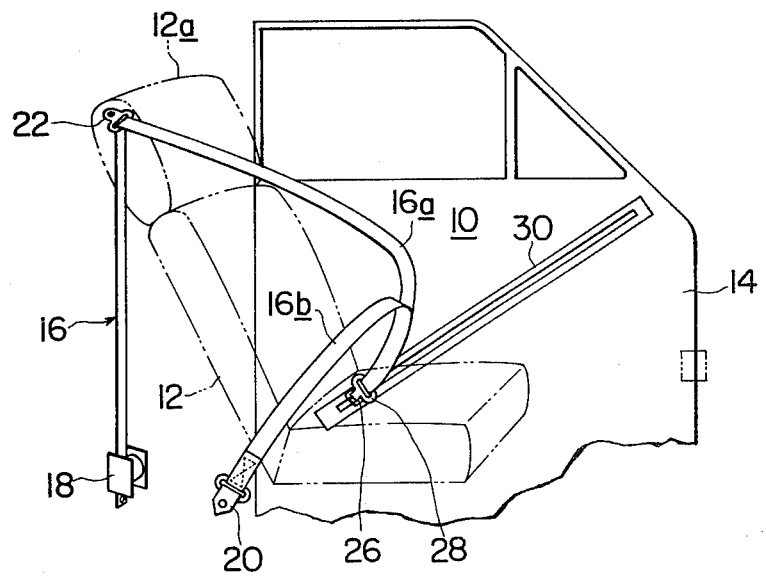
FIG. 1 is a perspective view of the interior of a part of a vehicle that includes an exemplary passive seat belt arrangement with the belt shown in occupant restraining position.

Referring to FIG. 1 of the drawings, there is shown an exemplary passive seat belt arrangement 10 which is equipped in a vehicle having a seat 12 and a forward hinged door 14.

The passive seat belt arrangement 10 shown comprises a seat belt 16 which has one end received in a conventional emergency-locking retractor 18 mounted on the floor of the vehicle, and the other end connected through a belt anchor 20 to the floor near the retractor 18. The emergency-locking retractor 18 has a function to stop feeding of the seat belt 16 therefrom upon sensing abnormal deceleration of the vehicle. A ring 22 through which the seat belt 16 passes is fixed to the inboard side of a head rest 12a of the seat 12. An intermediate portion of the seat belt 16 is slidably held by a through anchor (28) of the next-mentioned belt carrying mechanism 24 in a manner to divide the belt 16 into a shoulder belt section 16a and a lap belt section 16b, the shoulder belt section 16a being defined between the ring 22 on the head rest 12a and the through anchor 28 of the belt sliding mechanism 24, and the lap belt section 16b, being between the through anchor 28 of the carrying mechanisms 24 and the belt anchor 20 on the floor.

The belt carrying mechanism 24 comprises a carrying block 26 to which the above-mentioned through anchor 28 is fixed to move therewith. The carrying block 26 is slidably received in a diagonally oriented track member 30 which is mounted on the door 14. Although not shown in the drawings, a looped wire or chain having ends fixed to the respective longitudinal ends of the carrying block 26 is arranged in the door for assisting the movement of the carrying block 26 in the track member 30. Furthermore, a known locking device is provided in the lower end of the track member 30 to lock the carrying block 30 in place when the block 26 reaches the locking device in response to the closing movement of the door 14.

For facilitation of the description, explanation of operation of the seat belt arrangement 10 will be made first with respect to the occupant restraining position of FIG. 1 in which the carrying block 26 is locked, by the locking device, at the lowermost position of the track member 30 and with the door 14 closed.

When the door 14 is opened, the carrying block 26 is released from the locking device. During opening movement of the door 14, the block 26 moves diagonally forward in the track member 30 permitting finally the belt 16 to take the easy-enter position. This forward movement of the belt 16 is made against the biasing force exerted by the retractor 18.

When the door 14 is closed after seating of the occupant on the seat 12, the carrying block 26 returns to the lowermost position of the track member 30 by the force of the retractor 18, and finally the carrying block 26 is locked in place by the locking device, permitting the belt 16 to take the occupant restraining position.

Figure 2:
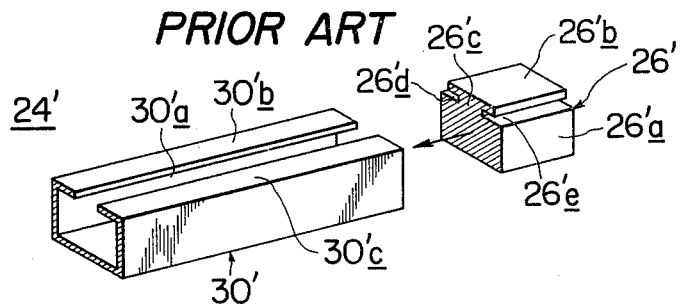
FIGS. 2 and 3 are perspective partial views of conventionally used belt carrying mechanism which can be adapted to the arrangement of FIG. 1.
Figure 3:
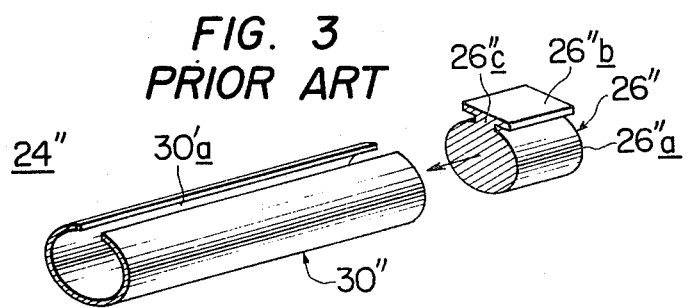

Hitherto, the belt carrying mechanism 24 used in the above-mentioned passive seat belt arrangement 10 has been of the type shown in FIG. 2 or FIG. 3.

The sliding mechanism 24' of FIG. 2 comprises a track member 30' which has a rectangular cross section leaving a longitudinally extending slit 30'a between two opposed flanges 30'b and 30'c thereof, and a carrying block 26' having rectangular prism portion 26'a and a flat plate portion 26'b which is integrally connected to the prism portion 26'a via a central wall portion 26'c defining two opposed grooves 26'd and 26'e therebetween, as shown. Steels, light metals and plastics are used as the material of the track member 30' and the carrying block 26'. In assemblage, the prism portion 26'a is slidably inserted in the chamber of the track member 30' with the grooves 26'd and 26'e slidably receiving the flanges 30'b and 30'c. Although not shown in this drawing, the above-mentioned through anchor 28 is fixed to the flat plate portion 26'b of the block 26'.

The carrying mechanism 24" shown in FIG. 3 is substantially the same as that of FIG. 2 with the exception of a slight difference in shape. The track member 30" of FIG. 3 has an elliptical cross section, and thus the block 26" has an elliptical cylindrical portion 26"a which is to be inserted in the chamber of the track member 30".

In the conventional belt carrying mechanisms 24' and 24" referred as above, however, an excessive frictional force is generated upon sliding of the carrying block 26' or 26" in the track member 30' or 30" by the nature of their constructions. Thus, it sometimes happens that the carrying block stops at an unwanted position defectively in the track member during opening or closing movement of the door 14 thereby preventing the seat belt 16 from preparing the easy-enter position or the occupant restraining position. Furthermore, the sliding but frictional movement of the carrying block 26' or 26" in the track member 30' or 30" causes generation of noise thereby preventing the passengers from having comfortable ride. Furthermore, the use of the carrying mechanism 24' or 24" under such frictional condition causes a high degree of abrasion in both the block 26' or 26" and the track member 30' or 30" thereby shortening the life of the mechanism 24' or 24".

Therefore, to eliminate the above-mentioned drawbacks is an essential object of the present invention.

DESCRIPTION OF THE EMBODIMENTS

Figure 4:
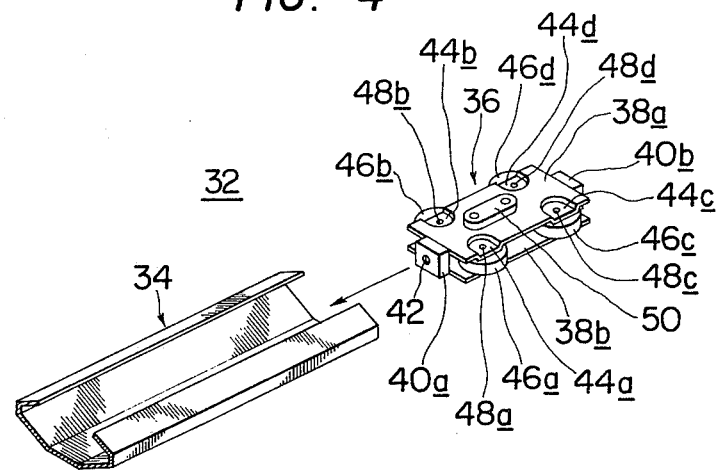
FIG. 4 is a view similar to FIGS. 2 and 3, but shows an improved belt carrying mechanism adaptable to a passive seat belt arrangement of the type shown in FIG. 1, according to the present invention.
Figure 5:
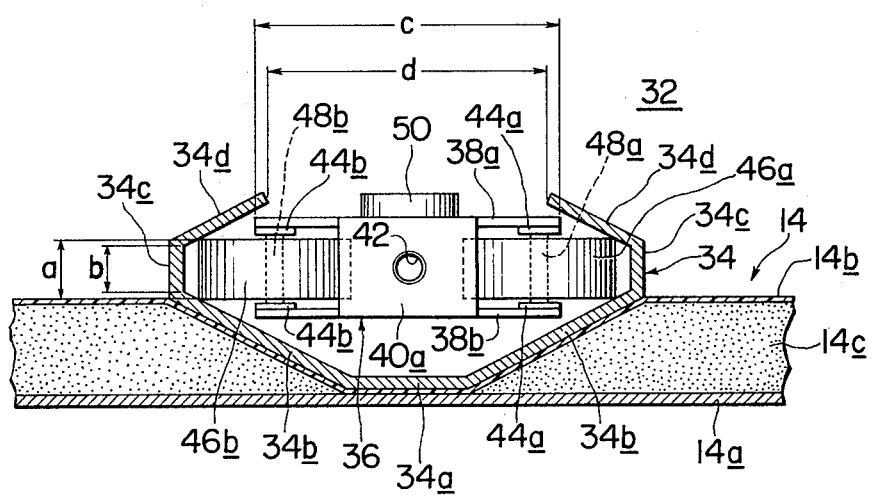
FIG. 5 is a cross-sectional view of the improved belt carrying mechanism of FIG. 4 with the belt carrying member set in the track member.

Referring to FIGS. 4 and 5, there is illustrated an improved belt carrying mechanism 32 which is used in a passive seat belt arrangement according to the present invention. The mechanism 32 comprises a track member 34 having an angular cross section, and a wheeled belt carrying device 36 which runs in the track member 34 in a manner as will be understood from the following.

The track member 34 is constructed to have an angularly C-shaped cross section as is best seen in FIG. 5 and comprises a longitudinally extending base portion 34a, two slanted portions 34b respectively extending from and along side edges of the base portion 34a, two base portions 34c respectively extending from and along the slanted portions 34b, and two slanted flange portions 34d respectively extending from and along the base portions 34c. As is seen from FIG. 5, the portions 34b, 34c and 34d of the track member 34 are symmetrically positioned with respect to an imaginary plane which perpendicularly passes the lateral center of the base portion 34a, and each slanted flange portion 34d and its opposing slanted portion 34b are arranged to define therebetween a channel having a generally V-shaped cross section. More particularly, the distance between the flange portion 34d and its opposing slanted portion 34b is increased with an increase of distance from the base portion 34c. The track member 34 is mounted on the inboard side of the door 14 in substantially the same manner as in the case of FIG. 1. The door 14 herein disclosed comprises an outer panel 14a, an inner panel 14b and a pad 14c sandwiched by the panels 14a and 14b and has an elongate recess (no numeral) into which the track member 34, more specifically, the base and slanted portions 34a and 34b thereof are received. Suitable connecting means is used for tight connection between the the track member 34 and the door 14.

The wheeled belt carrying device 36 comprises two identical parallel base plates 38a and 38b which are rectangular in shape. These plates are connected by two connectors 40a and 40b with a certain flat clearance therebetween, the connectors 40a and 40b being fixed to the longitudinal ends of the combined plates 38a and 38b, respectively. Each connector 40a or 40b is formed with a hole 42 into which an end of a later-mentioned wire (or chain) is fixedly connected. Each of the rectangular plates 38a and 38b is formed at its corners thereof with inboard projections 44a, 44b, 44c and 44d, the projections of the plate 38a being opposed to the corresponding projections of the plate 38b, as is best seen from FIG. 5. Four identical cylindrical rollers 46a, 46b, 46c and 46d are respectively supported by the paired opposed projections 44a, 44b, 44c and 44d via pins 48a, 48b, 48c and 48d, so that each roller is rotatable about the corresponding pin. Preferably, such projections 44a to 44d are formed by press forming (in this case, a recess appears at the back of each projection, as shown in FIG. 4) and known bearings are employed for smooth rotation of the rollers 46a to 46d. Mounted on the plate 38a is a block 50 to which a through anchor such as one 28 shown in FIG. 1 is fixed. Although not shown in the drawings, a wire or chain having ends connected to the connectors 40a and 40b is passed between two pulleys which are respectively mounted on the longitudinal ends of the track member 34, so that the wire (or chain) moves round but partially along the track member 34 for assisting the movement of the belt carrying device 36.

The wheeled belt carrying device 36 is longitudinally movably received in the track member 34 in a point-contact manner as shown in FIG. 5, that is, in a manner that the rollers 46a and 46c are engaged or supported at the cylindrical edges thereof with or by the slanted portion 34b and the slanted flange portion 34d, and the rollers 46b and 46d are engaged or supported at the cylindrical edges thereof with or by the slanted portion 34b and the slanted flange portion 34d. For this arrangement, the thickness "a" of each roller 46a, 46b, 46c or 46d is greater than the inner width "b" of each base portion 34c. Further, for preventing derailment of the wheeled belt carrying device 36 from the track member 34 even under breakage of the roller or rollers, the width "d" of each plate 38a or 38b is less than the distance "c" defined between the leading ends of the slanted flange portions 34d.

As a substitute for the above-mentioned track member 34 having an angularly C-shaped cross section, other type track members having, for example upwardly downwardly elongated U-shaped cross section or laterally elongated U-shaped cross section are employable in the belt carrying mechanism of the invention so long as the track members are so formed to provide "point-contacts" between the rollers of the carrying device 36 and the track member 34.

With the above description, it will be appreciated that the belt carrying device 34 can move quite smoothly and reliably in and along the track member 36 because of the provision of the rollers 46a, 46b, 46c and 46d. In fact, the rolling friction induced by rolling of the rollers in the track member 34 is much smaller than the sliding friction induced by sliding of the belt carrying member 24′ or 24″ in the track member 30′ or 30″, further the point-contacts made between the rollers of the belt carrying device 36 and the track member 34 will decrease the rolling friction therebetween.

Although in the foregoing description, it is described that the track member is mounted on the door of the vehicle, such track member may be fixed to other parts of the vehicle, such as a ceiling of the compartment.

Futhermore, the belt carrying device may be provided with a single roller. In this case however, it is required that the roller runs on the low-positioned channel section of the track member.

What is claimed is:

1. A passive seat belt arrangement in a motor vehicle having a door, comprising a seat belt, a track member mounted on an interior part of said vehicle and having a generally C-shaped cross section with a longitudinally extending slot thereof facing inboard of said vehicle and a belt carrying device longitudinally movably received in said tract member for carrying a portion of said seat belt so that movements of said belt carrying device in said track member in one and the other directions cause the seat belt to take easy-enter and occupant restraining positions, respectively, wherein said belt carrying device is provided with at least one cylindrical roller which runs in said track member by contacting only the peripheries of both of the circular edges thereof with the inside surface of said track member in a point contact manner upon longitudinal movement of said carrying device in and along said track member.

2. A passive seat belt arrangement as claimed in claim 1, in which said track member is mounted diagonally on the inboard side of said door which is forwadly hinged so that the movements of said carrying member in said track member in one and the other directions are induced by opening and closing movements of the hinged door.

3. A passive seat belt arrangement as claimed in claim 1, in which said belt carrying device is equipped with two cylindrical rollers which respectively run in two opposed channel sections each constituting one of the lateral sides of said track member, each channel section comprising a longitudinally extending base portion and two opposed and slanted wall portions separated by an upright side portion, all extending from and along said base portion, the distance between said two wall portions being progressively increased inwardly from said side portion and in which each of said two cylindrical rollers runs in a corresponding channel section by contacting only the peripheries of both of the circular edges thereof with inside surfaces of said opposed and slanted wall portions in a point contact manner upon longitudinal movement of said carrying device in and along said track member.

4. A passive seat belt arrangement as claimed in claim 1, in which said belt carrying member comprises two spaced identical plates between which said roller is rotatably disposed, said roller being partially projected outwardly from the side edges of said plates.

* * * * *